(12) United States Patent
Saunders et al.

(10) Patent No.: US 12,125,043 B2
(45) Date of Patent: Oct. 22, 2024

(54) SYSTEMS AND METHODS FOR RESERVATIONS AT A VENDING MACHINE

(71) Applicant: ROMAINE EMPIRE, INC., Chicago, IL (US)

(72) Inventors: Luke Saunders, Chicago, IL (US); Rajesh Kumar Karmani, Chicago, IL (US)

(73) Assignee: ROMAINE EMPIRE, INC., Chicago, IL (US)

( * ) Notice: Subject to any disclaimer, the term of this patent is extended or adjusted under 35 U.S.C. 154(b) by 769 days.

(21) Appl. No.: 16/267,039

(22) Filed: Feb. 4, 2019

(65) Prior Publication Data

US 2019/0244465 A1    Aug. 8, 2019

Related U.S. Application Data

(60) Provisional application No. 62/684,342, filed on Jun. 13, 2018, provisional application No. 62/626,292, filed on Feb. 5, 2018.

(51) Int. Cl.

| | |
|---|---|
| *G06Q 20/32* | (2012.01) |
| *G06Q 10/087* | (2023.01) |
| *G06Q 20/18* | (2012.01) |
| *G06Q 30/014* | (2023.01) |
| *G07F 7/00* | (2006.01) |
| *G07F 9/00* | (2006.01) |
| *G07F 9/10* | (2006.01) |
| *G06Q 10/0832* | (2023.01) |

(Continued)

(52) U.S. Cl.
CPC ......... *G06Q 30/014* (2013.01); *G06Q 10/087* (2013.01); *G07F 9/001* (2020.05); *G07F 9/002* (2020.05); *G06Q 10/0832* (2013.01); *G06Q 10/30* (2013.01); *G06Q 30/06* (2013.01)

(58) Field of Classification Search
CPC .... G06Q 30/014; G06Q 10/087; G06Q 20/32; G06Q 10/0832; G06Q 10/30; G06Q 30/06; G07F 9/002
See application file for complete search history.

(56) References Cited

U.S. PATENT DOCUMENTS

| | | | |
|---|---|---|---|
| 7,236,946 B2 * | 6/2007 | Bates | G07F 5/18 705/26.81 |
| 7,455,223 B1 * | 11/2008 | Wilson | G06Q 20/18 222/2 |

(Continued)

*Primary Examiner* — Talia F Crawley
(74) *Attorney, Agent, or Firm* — MARSHALL, GERSTEIN & BORUN LLP

(57) ABSTRACT

Systems and methods for facilitating reservations at a vending machine. The systems and methods include detecting a reservation request indicating a list of items and a purchase code and querying an inventory database to determine that the list of items are available. The systems and method also include generating a record in a reservation database corresponding to the reservation request, the record indicating a unique identifier purchase code and receiving an input indicative of the unique identifier purchase code. Additionally, the systems and methods include querying the reservation database to identify a reservation record that includes a unique identifier purchase code that matches the input unique identifier purchase code; and issuing a command to vend the list of reserved item included in the identified reservation record.

16 Claims, 7 Drawing Sheets

(51) Int. Cl.
  *G06Q 10/30* (2023.01)
  *G06Q 30/06* (2023.01)

(56) References Cited

U.S. PATENT DOCUMENTS

| | | | | |
|---|---|---|---|---|
| 7,870,029 B2* | 1/2011 | Bates | ............... | G07F 9/026 |
| | | | | 705/26.9 |
| 9,898,884 B1* | 2/2018 | Arora | ............... | G06Q 30/0226 |
| 10,438,200 B1* | 10/2019 | Griffith | ............... | H04L 63/0853 |
| 2002/0165787 A1* | 11/2002 | Bates | ............... | G07F 5/18 |
| | | | | 705/26.81 |
| 2002/0165788 A1* | 11/2002 | Bates | ............... | G07F 9/001 |
| | | | | 705/16 |
| 2005/0080510 A1* | 4/2005 | Bates | ............... | G06Q 30/0633 |
| | | | | 700/241 |
| 2007/0271194 A1* | 11/2007 | Walker | ............... | G06Q 30/02 |
| | | | | 705/80 |
| 2008/0125906 A1* | 5/2008 | Bates | ............... | G06Q 30/0641 |
| | | | | 700/241 |
| 2010/0268792 A1* | 10/2010 | Butler | ............... | G06Q 30/02 |
| | | | | 715/810 |
| 2012/0065775 A1* | 3/2012 | Ward | ............... | G07F 9/105 |
| | | | | 700/232 |
| 2012/0116577 A1* | 5/2012 | Ottomanelli | ............... | G07F 9/105 |
| | | | | 700/232 |
| 2014/0172159 A1* | 6/2014 | Unmussig | ............... | G07F 11/64 |
| | | | | 700/232 |
| 2014/0232753 A1* | 8/2014 | Walker | ............... | G07F 9/001 |
| | | | | 345/660 |
| 2014/0331131 A1* | 11/2014 | DeSellem | ............... | G07F 9/009 |
| | | | | 715/708 |
| 2015/0272347 A1* | 10/2015 | Winters | ............... | G08B 21/182 |
| | | | | 340/593 |
| 2016/0098882 A1* | 4/2016 | Holdych | ............... | G06Q 20/18 |
| | | | | 700/237 |
| 2016/0249748 A1* | 9/2016 | Winters | ............... | G08B 21/02 |
| | | | | 340/4.34 |
| 2016/0379287 A1* | 12/2016 | Dabiri | ............... | G06Q 40/02 |
| | | | | 705/26.43 |
| 2018/0315271 A1* | 11/2018 | Gharabegian | ............... | F03G 6/001 |

* cited by examiner

SYSTEMS AND METHODS FOR RESERVATIONS AT A VENDING MACHINE

CROSS-REFERENCE TO RELATED APPLICATIONS

This application claims priority to U.S. Provisional Patent Application No. 62/626,292 entitled "Perishability Prevention Platform Systems" and filed on Feb. 5, 2018 and U.S. Provisional Patent Application No. 62/684,342 entitled "Profitable Perishability Prevention Platform Systems" and filed on Jun. 13, 2018, the entirety of both of which are incorporated by reference herein.

BACKGROUND

The present disclosure generally relates to an inventory control system for providing a network of vending machines with a controlled atmosphere for storage and purchase of fresh food.

Conventionally, vending machines provide bottled drinks and small snack food. However, there is a need for selling a variety of fresh food including fresh fruit and vegetables. Yet, such market need is not met owing primarily to the short shelf life of fresh food and the cost of frequently replenishing the fresh food, not to mention the increase in food waste when the fresh food is not consumed before its end of shelf life. For example, one-fourth of the food a restaurant purchases is wasted, one-third of the food that an individual purchases is wasted, and one-tenth of the food that a grocery store purchases is wasted. Additionally, vending machines that sell fresh food need mechanisms to ensure that customers do not purchase expired food.

Conventional technologies (e.g., using preservatives, modified atmosphere packaging, etc.) that are designed to extend the shelf life of fresh products negatively impact the quality and directly affect the integrity of the product. For example, modified atmosphere packaging is a specific blend of atmospheric gases used in conjunction with a semi permeable film designed to slow the product aging process to improve the shelf life. However, incorporating modified atmosphere packaging is expensive and only temporarily solves the problem by merely extending the shelf life by a number of days and does not prevent the vending of expired or otherwise improperly sellable food.

SUMMARY

The present disclosure provides an inventory control system for providing a network of vending machines with a controlled atmosphere for storage and purchase of fresh food. The inventory of the vending machines may be refreshed automatically based on the feedback from the vending machine and/or manually from a vending machine operator (e.g., delivery driver). In some embodiments, the system includes dynamic pricing of the food items to influence the purchase behavior of consumers to move certain inventory and maximize revenue and minimize loss. For example, the price of a food item may be decreased as the food item nears its expiration date.

According to disclosed embodiments, a management server monitors inventory stored across the network of vending machines. In some implementations, the management server is a cloud computing platform comprised of a plurality of disparate servers acting in conjunction with one another to distributively perform the functionality described herein. In some embodiments, the management server enables client devices to remotely reserve vending machine inventory for pick up at a later time. For example, the client device may request to reserve a particular product at a particular vending machine. If the vending machine has sufficient inventory, the management server may associate the reservation with a unique identifier pickup code that the user may input to the vending machine to cause the vending machine to vend the reserved item. If not, the management server may recommend completing the reservation at a second vending machine within the network of vending machines that does have sufficient inventory.

Enabling remote reservations of vending machine inventory creates a race condition associated with processing contemporaneous requests for a particular item offered by a vending machine. For instance, if there is only one cobb salad remaining in the vending machine, a customer physically interacting with the vending machine may be attempting to purchase the cobb salad when a remote request to reserve the cobb salad is received. Accordingly, in one embodiment, when a customer is interacting with a vending machine, the vending machine inventory control system disables the remote reservation functionality to prioritize the physical customer. Similarly, the inventory control system restores the remote reservation functionality when the physical customer has completed their interaction with the vending machine. In these embodiments, the management server and/or the vending machine creates a reservation queue storing pending reservation requests until the inventory control system restores the remote reservation functionality. Upon restoration of the remote reservation functionality, the reservation requests in the queue are sequentially released for processing by the vending machine inventory control system. By implanting disclosed embodiments, vending machines are capable of offering remote reservations, and in some embodiments, in a manner that preserves the vending machine experience for physically-present customers.

According to embodiments disclosed herein, the inventory control system prevents the vending of expired items. In some embodiments, the inventory control system associates food items stored therein with expiry data. Accordingly, the inventory control system can prevent food items that are expired from being sold to customers. Similarly, in some scenarios, a particular item may be recalled by a supplier. Accordingly, the management server may analyze the inventory of the vending machine network to identify any vending machines that have the recalled item in inventory. The management server may then transmit a recall notice to the impacted vending machines. Upon receipt of the recall notice, the vending machine prevents the vending of the recalled item. By implementing these embodiments, vending machines are capable of offering perishable items while still ensuring that customers are unable to purchase expired or recalled products.

According to other embodiments, to reduce the downtime associated with restocking vending machines, the vending machine may include an automatic unloading routine. That is, upon receiving an unloading command, the vending machine may be configured to dispense any expired or recalled product for disposal by a service professional. In some embodiments, the service professional is associated with a service electronic device (for example, a phone, a tablet, a phablet, smart glasses, a smart watch, a device connected to a service vehicle, such as via an on-board diagnostic port, etc.). In some embodiments, when the service electronic device is brought within communicative range (e.g., within range of a Wi-Fi or Bluetooth transceiver) of the vending machine, the service electronic device automatically establishes a connection with the vending machine and transmits the unloading command. In other embodiments, the management server associates the vending machine with a geofence. Accordingly, the service electronic device may be configured to periodically report its location to the management server. If the management server detects that the service electronic device is within the vending machine's geofence, the management server may transmit the unloading command to the vending machine. In still other embodiments, the service electronic device may present a user interface element that enables the service professional to manually transmit the unloading command to a vending machine, either directly, or via the management server.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

DETAILED DESCRIPTION

Figure 1:
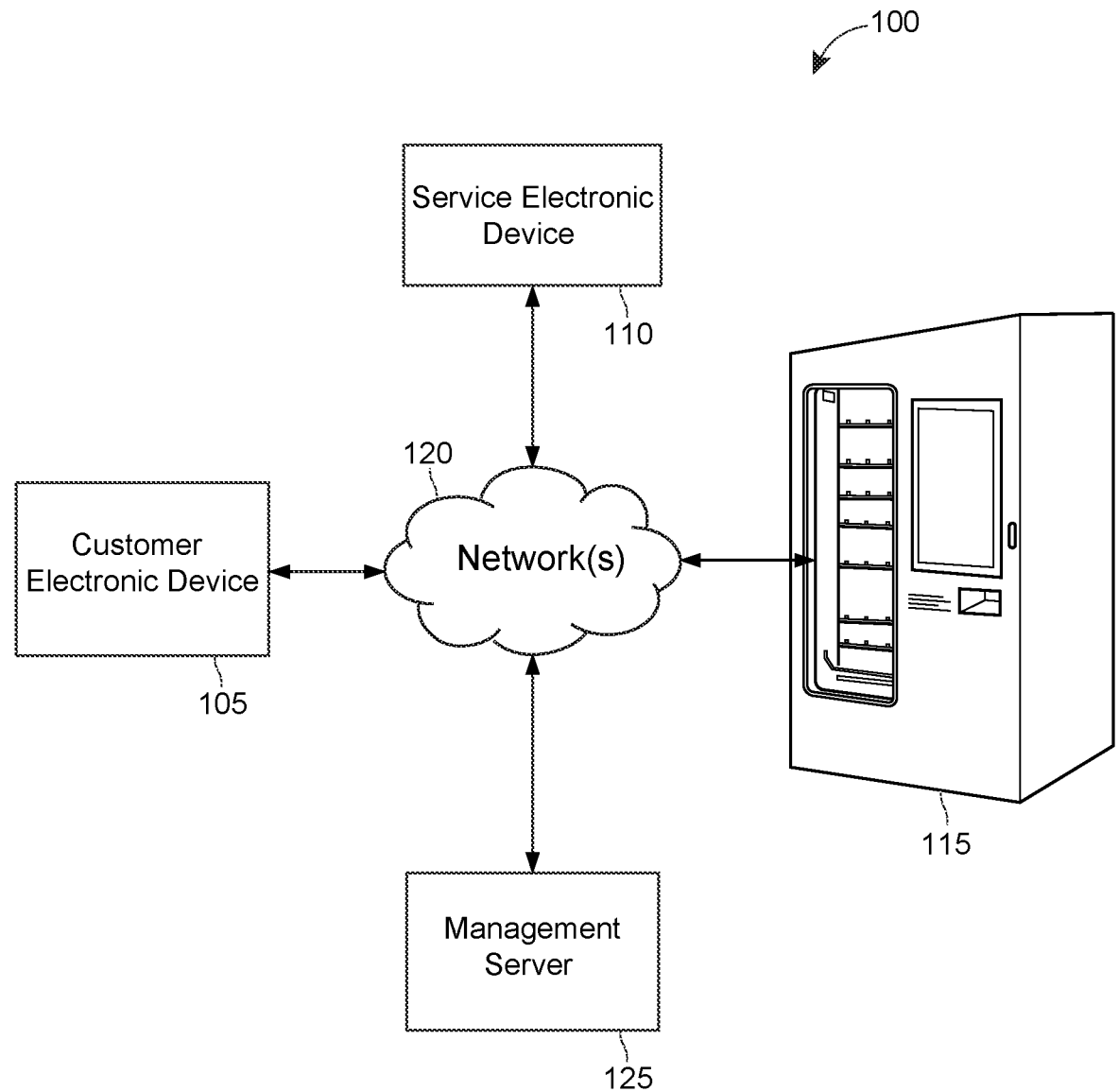
FIG. 1 illustrates an example vending machine environment at which the disclosed techniques are implemented.

Referring to the figures in detail, FIG. 1 illustrates an example environment 100 that includes a vending machine 115 connected to a network 120. Although, FIG. 1 illustrates a single vending machine 115, the environment 100 may include any number of additional vending machines 115 to form a network of vending machines that provide fresh food. Each vending machine 115 is a self-service unit that combines electro-mechanical dispensing components, network connectivity, and a user interface for customer interaction. In some implementations, the dimensions of the vending machine 115 enables placement of the vending machine 115 in high-traffic locations that are more convenient than traditional retail locations.

The vending machine 115 can be any suitable vending machine. For example, the vending machine 115 may also include a storage system for holding individual food products for purchase. The storage system may include a plurality of slots adapted to store a plurality of individually dispensable items loaded therein. The slots may be substantially horizontal, such as embodiments that include a conveyor belt, shelf, or coil, or substantially vertically. In an example, each individual storage unit of the slot is associated with a sensor and/or a slot location identifier.

The vending machine 115 may also include an atmospheric control system that includes a variety of sensors and controllers for temperature, air composition, and/or humidity control. The temperature control components may include a cooling or refrigerating apparatus, a heating or warming apparatus, and/or other temperature control apparatuses to maintain a desired temperature associated with the items stored therein. For example, some fresh foods are best stored between 35-40° F. (1.66-4.44° C.). On the other hand, frozen food may be best stored between −5-0° F. (−20.26-−17.78° C.). In some embodiments, the vending machine includes different temperature control apparatus to regulate the temperature of different slots. A temperature control apparatus may include one or more sensors to provide feedback to a regulator of the temperature control apparatus. According to certain aspects, the atmospheric control system may be controlled by a remote system such as a management server 125.

The vending machine 115 may also include a point of sale system. In some embodiments, the point of sale system includes one or more mechanisms to receive a customer selection of a particular item. For example, the selection mechanisms may include one or more buttons and/or a touch screen display. Additionally, the point of sale system of the vending machine 115 may include a payment system adapted to receive and/or process cash, gift cards, promotions, customer account credits, and/or credit cards. The vending machine 115 may also include a merchandise selector including a user interface, key pad, and/or switches for customers to select the desired item for purchase. According to certain aspects, the inventory control system of the vending machine 115 implements dynamic pricing of items to generate prices and promotions to influence the purchase behavior of consumers to move certain inventory and maximize revenue and minimize loss.

As illustrated in FIG. 1, the vending machine 115 is in communication with the management server 125 via the network 120. The network 120 may facilitate any type of data communication via any current or future-developed standard or technology (e.g., GSM, CDMA, TDMA, WCDMA, LTE, EDGE, OFDM, GPRS, EV-DO, UWB, IEEE 802 including Ethernet and Wi-Fi, WiMAX, Bluetooth, and others). In some embodiments, the network 120 utilizes two or more of the communication standards or technologies. For example, the vending machine 115 may communication with the management server 125 via a IEEE 802 connection and a service electronic device 110 via a Bluetooth connection.

In some embodiments, the inventory control system of the vending machine 115 is configured to dynamically monitor inventory within the vending machine 115. In one example, the inventory management system of the vending machine 115 communicates the current inventory to the management server 125 to maintain a central record of the inventory. In this example, the inventory update may include a sale record associated with the change in inventory. In some embodiments, the vending machine 115 monitors the inventory based on a sensor associated with the various item slots. When an item is purchased, the inventory control system detects corresponding sensor data that indicates that the item is no longer within the vending machine 115. In other embodiments, the inventory control system monitors transaction data from the point of sale system to update an inventory record accordingly. According to aspects, the transaction data may also include customer data such as demographic data, customer profile information, addressing information (including an identity and/or address of a customer electronic device 105), and so on.

According to aspects, the allocation of inventory to the vending machine 115 may be regulated by the management server 125, such as by increasing inventory for high volume locations or days. Similarly, the management system 125 may modify inventory allocation based on product data, customer feedback, and sales of vending machines 115. In an example, the management server 125 forecasts production allocation based on the vending machine location, demographics, and purchase history. Based on this forecast, the management server 125 may automatically generate a replenishing product list to be delivered the next day (or any suitable regular time intervals) to replenish the inventory of the vending machine 115. Further, if the system detects a particular item has increased in sales at the vending machine 115, the management server 115 can suggest or add similar items to the inventory of the vending machine 115. Similarly, the management server 125 may also suggest or add items to the inventory of other vending machines located near the vending machine 115. For example, if a particular salad has increased in sales, the management server 125 may increase in the inventory of that particular salad by increasing a count of the salad in the inventory list of items to be delivered to the vending machine 115 (or other vending machines 115) during the next interval.

According to aspects, the inventory the management server 125 allocates to the vending machine 115 may be automatically updated in regular time intervals and/or continually in real time based on the transaction records and/or inventory reports received from the vending machine 115. In some embodiments, the management server 125 generates promotional prices to be implemented at the vending machine 115. For example, based on the feedback of the vending machines 115, the management server 125 may generate customized promotions (e.g., advertisements, coupons, etc.) that are sent to one or more customer devices 105 via the network 120. In some implementations, the promotions are targeted based on customer data maintained at the management server 125. For example, based on the inventory loss data and the customer data, the management server 125 may generate and transmit a discount promotion via a push notification or text message to targeted customer devices 105.

As another example, the management server 125 analyzes transaction data to identify trends. For example, the transaction data may indicate that women tend to buy a particular sandwich. Accordingly, the management server 125 may generate a promotion for the sandwich that is targeted towards female customers. Similarly, the transaction data may indicate that customers of a particular age range tends to purchase a particular wrap. Accordingly, the management server 125 may update the inventory list to increase the number of wraps for the vending machine 115 (assuming the vending machine 115 is located in a region that has a large customer base in that age group).

As another example, the inventory control system of the vending machine 115 maintains expiration data with the inventory. For example, the expiration data may be include a stock date, a shelf life, and/or an expiration date. In some embodiments, the vending machine 115 synchronizes the expiration data with the management server 125. Accordingly, the management system 125 may determine that a particular item is approaching its expiration date and generate a customized promotion for the particular item. The generated promotion can be sent to a targeted set of customer devices 105 to incentivize the customers to purchase the particular salad before it must be removed as food waste. The consumer device 105 may be targeted based on demographic data, prior purchase history, or other data attributes.

The combination of the production allocation forecasting, the vending machine inventory feed data, the automated customer relationship management, and the customized promotion generation enables the management server 125 to support the distribution of fresh food products with short shelf life available at all times in a profitable manner.

In some embodiments, the customer electronic devices 105 execute an application configured to interact with features of the management system 125 and/or the vending machine 115. The customer electronic devices 105 may include any electronic device that supports user interactions and the ability to communicate over the networks 120. For example, the customer electronic device 105 may be a smartphone, a desktop computer, a laptop, a tablet, a phablet, a smart watch, smart glasses, wearable electronics, a home assistant device, and so on. In some embodiments, the customer electronic device 105 supports voice-based interactions for obtaining indications user inputs that control operation of the application. In some scenarios, the application is a dedicated application for interacting with the features of the management server 125. In other scenarios, the application is a browser application executing instructions associated with a website tailored to support the features of the management server 125.

In some embodiments, the application enables the customer electronic device 105 to interact with the management server 125 to order or reserve an item from the vending machine 115. Accordingly, the application causes the customer electronic device 105 to transmit an inventory query to the management server 125, and in response receive an inventory list based on the inventory data maintained by management server 125 corresponding to the vending machine 115. In some scenarios, the inventory query includes location data corresponding to the customer electronic device 105 such that the management server may analyze the inventory list of vending machines 115 located proximate to the customer electronic device 105. For example, customer electronic device 105 may transmit an inventory query for a specific salad and the management system 125 may determine a vending machine 115 closest to the customer electronic device 105 that has the salad available for purchase.

According to aspects, the application also causes the customer electronic device 105 to transmit an electronic identification (e.g., phone number, credit card, user name identification, email address, device identifier, IP address, etc.) to the management server 125. The management server 125 may utilize the electronic identification to track a purchase history associated with the customer. If the management system 125 detects that the electronic identification is associated with a new customer electronic device 105 and/or customer, the management server 125 may prompt the customer electronic device to present a user interface adapted for creating a user profile. As a result, subsequent purchases may occur faster and more efficient. Further, the user profile enables the management system 125 to transmit product suggestions and/or promotions o the customer electronic device 105 based on the customer's purchase history, demographics, location, and/or other data attributes in a customer profile.

In some embodiments, to ensure food safety, the management system 125 and/or the vending machine 115 may prevent the purchase of particular items sold in the vending machine 115. As one example, if the temperature of the vending machine 115 is below or above a certain threshold for a certain time, the vending machine 115 locks out temperature-sensitive products from being sold. To this end, the inventory data associated with each product may include a range of suitable storage temperatures. If the temperature is outside of the suitable temperature range for a particular item, the vending machine may prevent purchase of the particular item. In this example, the vending machine 115 may still provide for purchase other items for which the temperature range is still within the suitable temperature range.

As another example, the management system 125 may monitor the temperature of the vending machine 115 and/or the items therein. Accordingly, the vending machine 115 may periodically transmit temperature readings over the network 120 to the management server 125. If the management system 125 detects the temperature is outside of the suitable temperature range for a particular item, the management system 125 may alert a technician by transmitting a maintenance request to a service electronic device 110. If a technician does not arrive and complete the maintenance on the system within a given time (e.g., 1 hour, 2 hours, 4 hours, etc.), the management system 125 transmits a lockout command to the vending machine 115 to prevent the purchase of items outside of the suitable temperature range. Therefore, customers cannot purchase any items that have been exposed to improper temperatures for a length of time that would render the item unsafe for consumption.

According to certain aspects, the management system 125 may be configured to block the purchase of particular items based on a product recall and/or complaint. For example, a supplier or a government agency may recall a particular item due to a defect or risk of contamination. Accordingly, the management server 125 may receive a notification that a particular item has been recalled and should not be sold. The management server 125 may then transmit over the network 120 an item lockout command to any vending machine 115 that includes the item in inventory. In response to receiving the lockout command, the vending machine 115 may prevent the purchase of that item. Additionally, the management server 125 may prevent customer electronic devices 105 from purchasing the recalled item. Further, the management system 125 may notify one or more customer electronic devices 105 that have previously purchased the recalled item. In some implementations, the notification includes a promotion, coupon, or credit to their account to reimburse the customer for the purchased item.

In another example, the management system 125 may block the purchase of an item reserved via customer electronic device 105. Accordingly, the management system 125 may associate the reserved item with a purchase code. The management server 125 may then push the purchase code to the vending machine 115. The vending machine 115 may then only dispense the reserved item upon receiving an input of the purchase code. Other attempts to purchase the reserved item are blocked by the vending machine 115.

As illustrated in FIG. 1, the service electronic device 110 is also in communication with the management server 125 and/or the vending machine 115 via the network 120. In some embodiments, the service electronic device 110 is a personal electronic device (e.g., smartphone, tablet, smart watch, etc.) carried by service personnel. In other embodiments, the service electronic device 110 is embedded in a vehicle operated by service personnel. In these embodiments, the service electronic device may establish a communication link with a personal electronic device of the service personnel.

In one embodiment, the management system 125 and/or the vending machine 115 establishes a geofence around the vending machine 115. As it is generally use herein, the term "geofence" refers to a geographical boundary established surrounding the vending machine 115. In some embodiments, the geofence is established based on a positioning system (e.g., GPS). In other embodiments, the geofence is established based on network connectivity (such as the ability to detect the presence of a broadcast identifier or a signal strength or quality metric above a threshold level). In some implementations, when the management system 125 and/or the vending machine 115 detects the presence of the service electronic device 110 within the geofence, the vending machine 115 may automatically unload expired or otherwise unsellable products. Automatic unloading reduces the downtime associated with the driver manually unloading the machine of its unsellable products as part of the restocking process.

According to aspects, the management system 125 transmits inventory notifications to the service electronic device 110 to indicate restocking instructions for the vending machine 115. Thus, upon arriving at the location of the vending machine 115, the driver can follow instructions indicated by the service electronic device. For example, the restocking instruction may indicate which items in the vending machine need to be removed, as well as which new food items to place into the vending machine for purchase. In some implementations, the instructions are displayed in a planogram format such that the service personnel is able to readily determine item location within the vending machine 115.

Example Vending Machine

Figure 2:
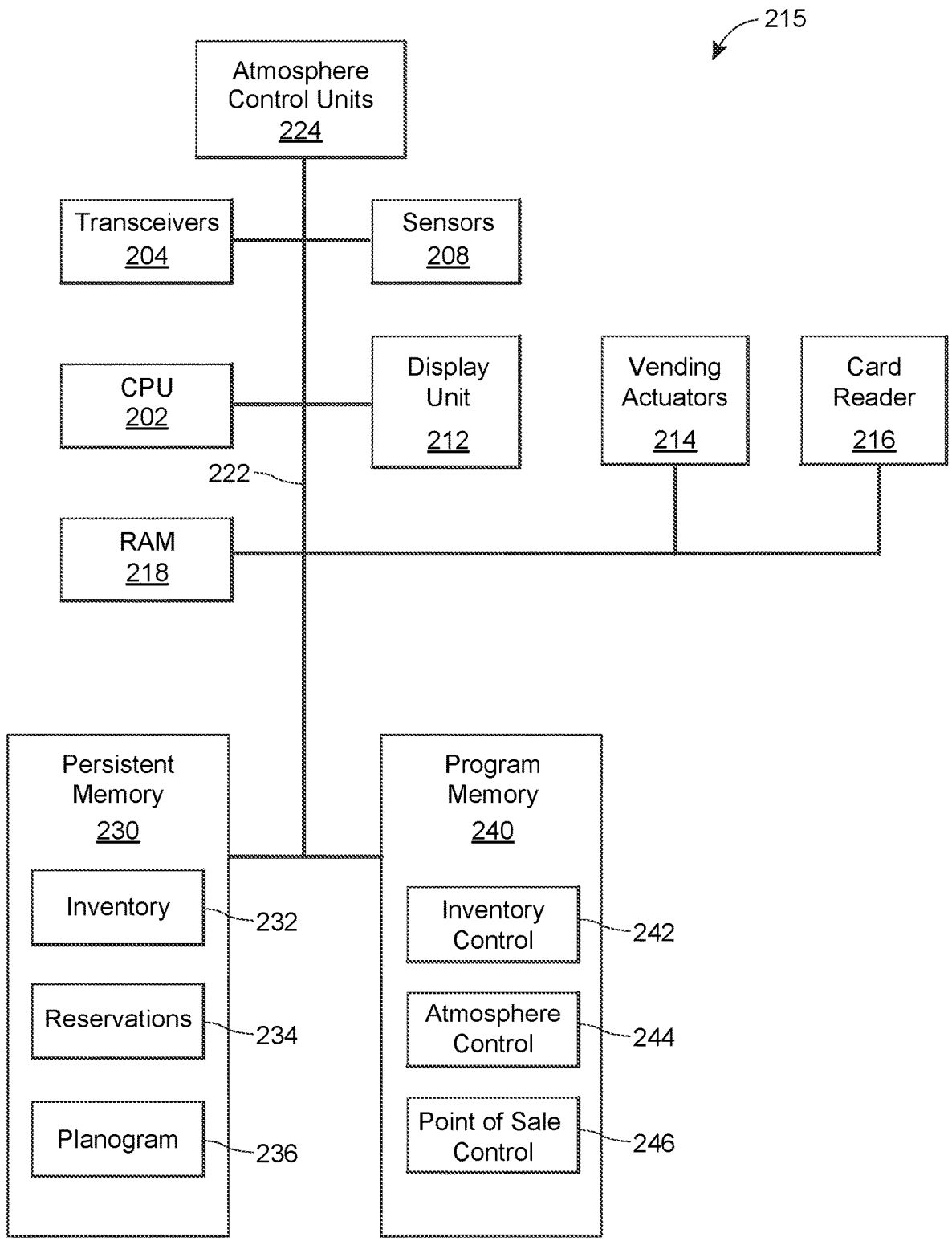
FIG. 2 is a block diagram of an example vending machine that may be used in the example environment of FIG. 1.

Turning to FIG. 2, illustrated is an example vending machine 215, such as the vending machine 115 of FIG. 1, at which functionality described herein is implemented. The vending machine 215 includes one or more processors, such as the depicted central processing unit (CPU) 202. Although not depicted, the vending machine may also include a graphics processing unit (GPU). During operation, the CPU 202 executes instructions stored in a program memory module 240 coupled to the CPU 202 via a system bus 222. In some implementations, the program memory module 240 is implemented in a random access memory (RAM) module 218, a persistent memory module 230, or both. The program memory module 240 may also store computer-readable instructions that regulate the operation of the vending machine. One set of instructions may be an inventory control application 242 that contains instructions to facilitate inventory control functionality. For example, the inventory control application 242 may maintain an accurate record of the various items stored at the vending machine 215. This record may be maintained at the inventory database 232 of the persistent memory 230. The records in the inventory database 232 may include indications of an item identifier, a stock keeping unit (SKU) identifier, a location (such as a slot identifier), expiration data, an item status (e.g., available, reserved, expired, locked, sold, etc.), and so on. In some embodiments, the inventory database 232 also includes SKU-based records that include indications of SKU quantity, a cost, SKU status (e.g., normal, recalled, promoted, etc.). The SKU-based records may be automatically update in response to changes to item records. For example, when the inventory control application 242 updates an item record to indicate that a particular item has been sold, the SKU-record may automatically decrement a quantity parameter.

As another example, the slot identifier associated with the item or SKU records may be determined based upon a stored planogram 236. The planogram 236 is a "map" that associates the various slots of the vending machine 215 with particular items or SKUs. In some embodiments, updates to the planogram 236 are transmitted by a management server to the vending machine 215 for local storage. In these embodiments, the planogram 236 may also be transmitted to a service electronic device such that service personnel may maintain the vending machine inventory in accordance with the planogram 236. In other embodiments, each individual item is uniquely tagged (such as with an RFID tag or a QR or other barcode). In these embodiments, the sensors 208 detect the location of the various items to dynamically update the planogram 236. Additionally, the inventory control application 242 may transmit updates to the planogram 236 to the management server to synchronize back-end systems.

As illustrated in FIG. 2, the inventory control application 242 may also control vending actuators 214 to vend a particular item. It should be appreciated that in other embodiments, control of the vending actuators 214 is processed by a separate application. The vending actuators 214 may be any actuator that controls a vending mechanism (e.g., a coil, a conveyor belt, a motorized shelf, a grabbing arm, a suction unit, etc.). In some embodiments, the vending actuators 214 include a separate controller configured to interpret control signals generated by the inventory control application 242 and transmitted over the system bus 222. For example, in response to detecting a purchase event for a Napa salad, the inventory control application 242 may query the inventory database 232 to detect a slot that stores a Napa salad and generate a vending command that indicates the slot identifier. The controller of the vending actuators 214 may include a queue to process multiple vending commands associated with a multi-item order.

In some embodiments, the inventory control application 242 also maintains a reservation database 234 that includes a list of items remotely reserved via interactions with a management server. Each reservation may indicate the item and a purchase code utilized to pick up a reserved item. After the item has been picked up, the inventory control application 242 removes the reservation from the reservation database. In some implementations, the inventory control application 242 monitors a duration a particular reservation has been in the reservation database 234. If the duration exceeds a threshold duration, the inventory control application 242 may transmit an indication to a management server to take a remedial action.

As another example, the inventory control application 242 may detect a signal from a management server to prevent the sale of a particular item. In response, the inventory control application 242 may modify the status of the item such that other applications (such as the point of sale application 246) do not include the particular item in a list of available items. As yet another example, the inventory control application 242 may detect a signal to automatically unload one or more items. In response, the inventory control application 242 may analyze the inventory database 232 to detect any items associated with a status that indicates the item is unsellable (e.g., expired or recalled). The inventory control application 242 may then generate a control signal for the vending actuators 214 for each unsellable item.

The program memory 240 may also include a set of instructions that comprises an atmosphere control application 244. The atmosphere control application 244 may control the operation of the atmosphere control units 224 via instructions transmitted over the system bus 222. The atmosphere control units may include refrigeration units, heating units, humidifiers, oxygenators, and/or any other mechanism that controls the atmospheric environment within the vending machine 215. In some embodiments, the atmosphere control application 244 divides the vending machine into different climate zones to maintain multiple atmospheric environments simultaneously. Accordingly, the atmosphere control application 244 may utilize the output of sensors 208 to generate appropriate control signals for the atmosphere control units 224.

The program memory 240 may also include a set of instructions that comprises a point of sale control application 246 configured to support the ordering of items and the processing of payments at the vending machine 215. The point of sale control application 246 may be configured to cause a display unit 212 to present one or more interfaces that guide a customer through the purchase process. The display unit 212 may include a touch-screen display for receiving user input. In some embodiments, the point of sale control application 246 may query the inventory database 236 to populate the interfaces with indications of the available inventory. As part of the payment process, the point of sale control application 246 monitors inputs at a card reader 216 to detect credit card information for completing the purchase.

In addition to programs, the RAM module 218 and the persistent memory module 240 may store data in a volatile or non-volatile mode, respectively. The RAM module 218 and the persistent memory module 240 further include one or more forms of fixed and/or removable memory, such as read-only memory (ROM), electronic programmable read-only memory (EPROM), RAM, erasable electronic programmable read-only memory (EEPROM), and/or other hard drives, flash memory, MicroSD cards, and others. For example, the inventory database 232, the reservation database 234, and the planogram 236 may be stored as data structures in the persistent memory module 230.

The vending machine 215 may further include transceivers 204 that enable the vending machine 215 to send and receive data over a wireless or wired network (such as the network 120 described with respect to FIG. 1). The transceivers 204 may include one or more transceivers (e.g., WWAN, WLAN, WPAN, EVDO, CDMA, GSM and/or LTE transceivers) functioning in accordance with IEEE standards, 3GPP standards, or other standards. In some embodiments, when the point of sale application 246 detects a customer interacting with the display unit 212, the point of sale application 246 may disable the transceivers 204 to prevent the reception of new reservations. Similarly, after the point of sale application 246 detects that the customer is no longer interacting with the display unit 212 (e.g., by detecting a sales event or the expiration of a usage timer), the point of sale application 246 re-enables the transceivers 204. In alternative embodiments, in response to detecting the customer interaction, the point of sale application 246 establishes a queue for requests received via the transceivers 204. Upon detecting that the customer is no longer interacting with the display unit 212, the point of sale application 246 processes requests in the established queue. In still further embodiments, the point of sale application 246 may both disable the transceivers 204 and establish a queue for new requests (e.g., by transmitting a queue command to the management server).

It should be appreciated that the vending machine 215 may include additional or fewer components than what is depicted by FIG. 2. For example, the vending machine may include keys, mice, buttons, or other physical input devices to facilitate user interactions with the vending machine 215. As another example, the vending machine 215 may include one or more external ports or other components that enable service personnel to interact with the vending machine 215, such as a USB or other port via which a service electronic device can be connected to transmit diagnostic messages for troubleshooting and/or maintenance activities. As yet another example, the vending machine 215 may include one or more cameras, scanners, or other sensors connected to track the items stored at the vending machine 215 and/or to support security surveillance, stock monitoring, scanning customer electronic devices, and/or customer biometric recognition, for example.

Reserve and Pay

Figure 3:
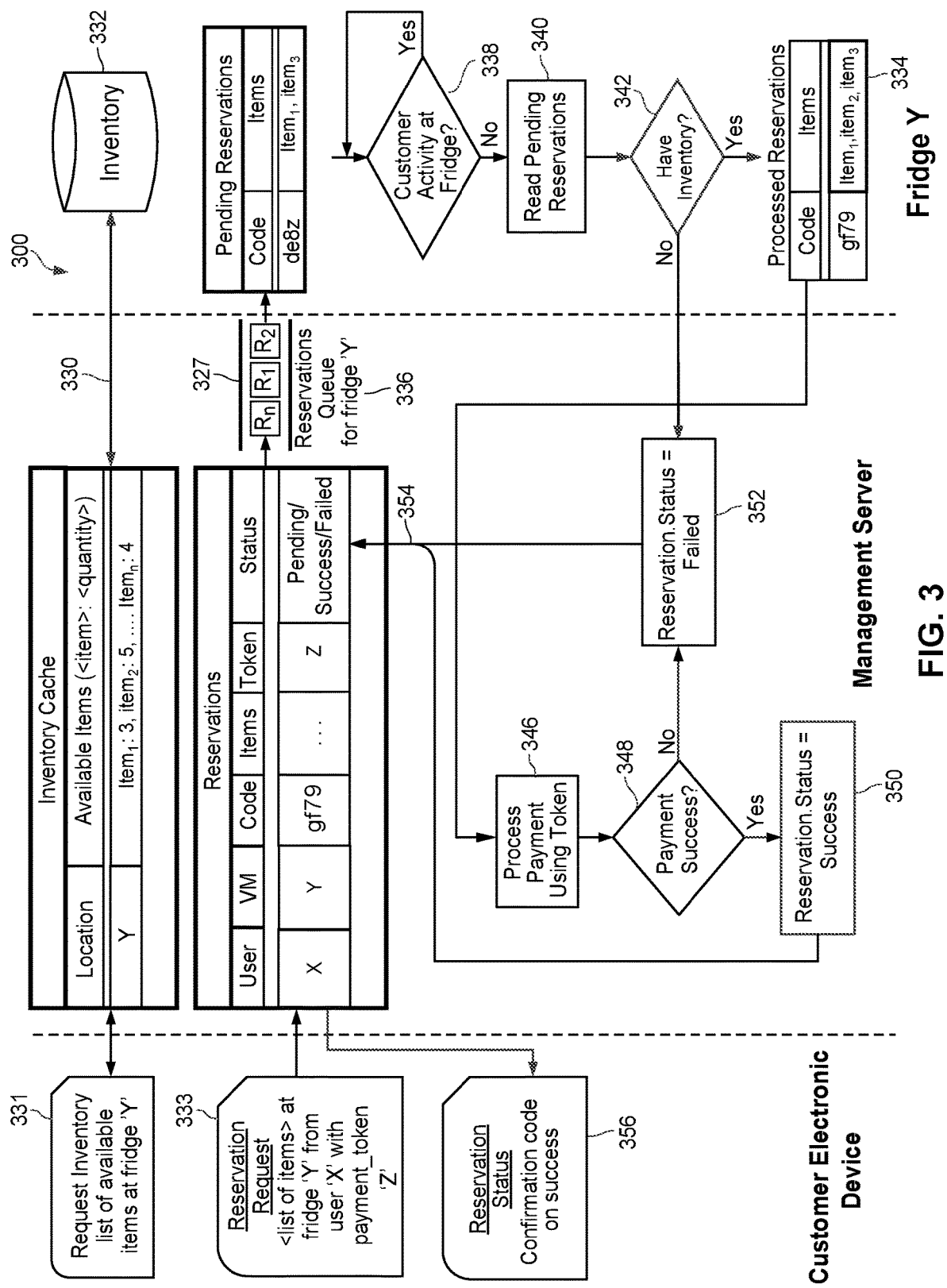
FIG. 3 is a flow diagram indicative of a reservation process that may be implemented in the example environment of FIG. 1.
Figure 4:
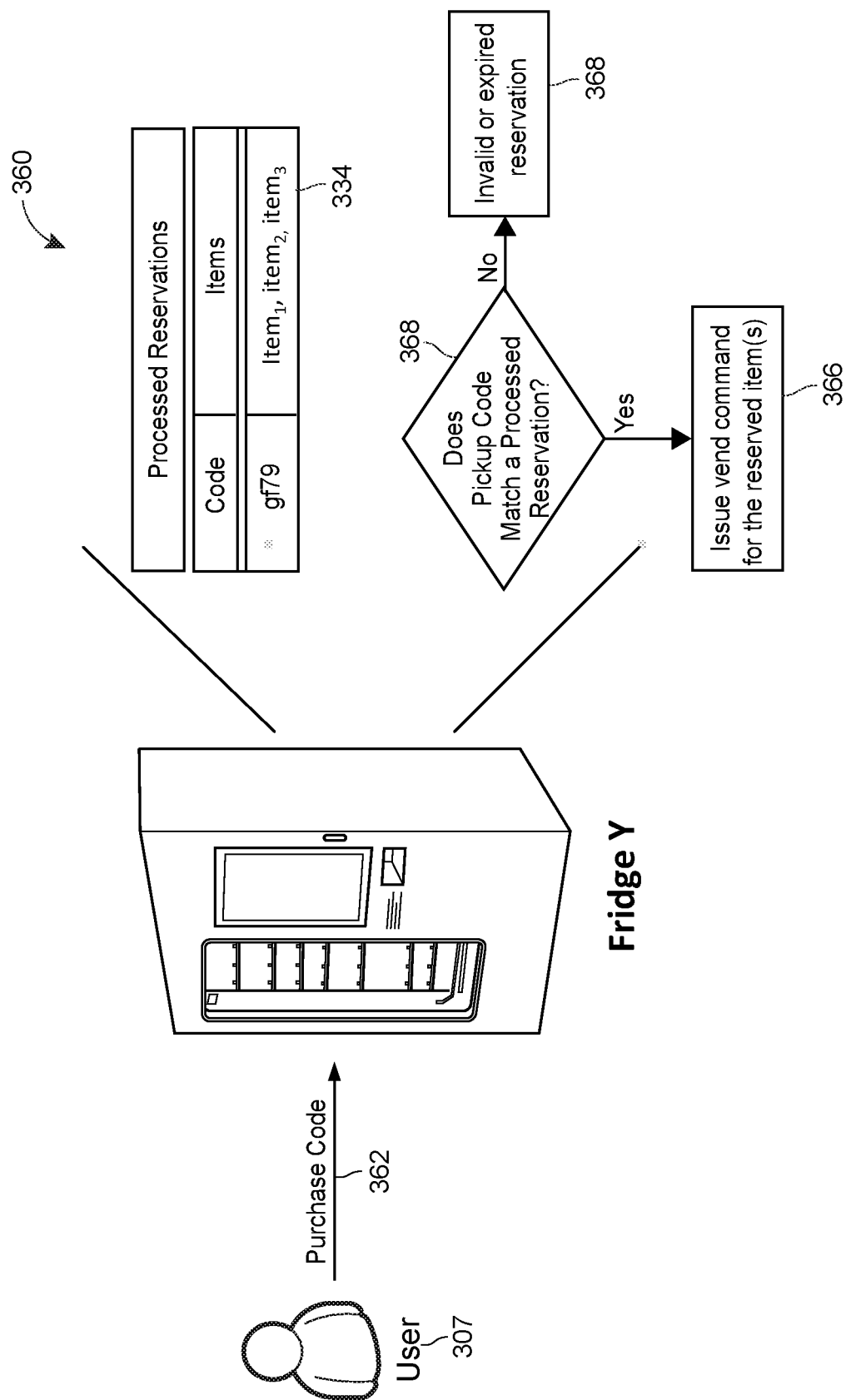
FIG. 4 is a flow diagram indicative of a reserved item pickup process that may be implemented in the example environment of FIG. 1.

FIGS. 3 and 4 illustrate flow diagrams 300 and 360, respectively, associated with a process for customers to remotely reserve items at a vending machine, such as the vending machines 115 or 215 of FIGS. 1 and 2, respectively. The management server and the vending machine may be in communication with one another over one or more networks, such as the networks 120 of FIG. 1. The flow diagram 300 illustrates the process for reserving a particular item; whereas the flow diagram 360 illustrates the process for picking up a reserved item.

The process 300 begins when a management server (such as the management server 125 of FIG. 1) and the vending machine (labeled as Fridge Y) synchronize (step 330) the inventory maintained at Fridge Y. As described above, Fridge Y includes an inventory database 332 (such as the inventory database 232 of FIG. 2) that includes one or more records associated with items stored at the Fridge Y. In some scenarios, as the inventory at Fridge Y changes, Fridge Y transmit indications to the management server to synchronize the inventory. In other scenarios, the management server periodically polls Fridge Y to synchronize the inventory. In any event, the management server may maintain an inventory cache of available items located at Fridge Y. The cache may indicate an identifier of any available items and a corresponding quantity available. It should be appreciated that while FIG. 3 only depicts an example inventory cache for Fridge Y, the inventory cache may include an available item list for any number of vending machines within the network of vending machines.

According to aspects, a customer interacts with a customer electronic device (such as the customer electronic device 105 of FIG. 1) to begin the item reservation process. To populate a user interface presented by the customer electronic device, the customer electronic device transmits (step 331) a request to the management server to retrieve the inventory at Fridge Y. The request may be transmitted over one or more communication networks, such as the communication network 120 of FIG. 1. In response, the management server accesses the inventory cache to retrieve the list of available items at Fridge Y and transmits the list to the customer electronic device. In the illustrated scenario, the customer interacted with the user interface to view the inventory specifically at Fridge Y. However, in other scenarios, the request may instead include location data which is interpreted by the management server to identify a set of vending machines proximate to the location of the customer electronic device.

The customer may then navigate user interfaces that indicate the inventory of the Fridge Y to reserve a particular item stored at Fridge Y. In some embodiments, the user interfaces are navigated by one or more voice inputs. As part of the reservation process, the customer electronic device may prompt the customer to enter a payment information to obtain payment information to be utilized to hold the reservation (i.e., a payment token). After the reservation information is collected by the customer electronic device, the customer electronic device transmits (step 333) a reservation request to the management server. As illustrated, the reservation request includes an indication of the particular items, an indication of the vending machine, an indication of the customer, and an indication of the payment token.

Upon receiving the reservation request, the management server creates a record at a reservation database corresponding to the reservation request. As part of creating the record, the management server may assign the reservation a randomly-generated unique identifier purchase code for the reservation. Additionally, the reservation record may include a reservation status. When the reservation record is first created, the management server may set the reservation status to be "Pending."

As described herein, to preserve the in-person experience for users of Fridge Y, if a customer is interacting with Fridge Y, Fridge Y may deactivate its capabilities for receiving new reservations. Accordingly, the management server may communicate with Fridge Y to determine if Fridge Y is currently capable of receiving new reservations. If not (e.g., one or more transceivers of Fridge Y are disabled), the management server establishes a reservation queue 327 of pending reservations associated with Fridge Y at the management server. The management server then stores (step 336) the reservation request in the queue 327. It should be appreciated that any additional reservation requests received by the management server for items at Fridge Y prior to Fridge Y restoring reservation capabilities are also stored in the queue 327. Accordingly, when Fridge Y restores the reservation capabilities (e.g., the one or more transceivers of Fridge Y are re-enabled), the reservation requests are processed in the order they are received. It should be appreciated that while FIG. 3 illustrates the queue 327 being maintained at the management server, other implementations may maintain the reservation queue 327 at Fridge Y. In these implementations, Fridge Y may route all new requests to the queue 327 instead of disabling the one or more transceivers.

At step 338, Fridge Y detects whether there is customer activity at Fridge Y. For example, customer activity may be detected by determining that a user is interacting with a display unit at Fridge Y or by analyzing camera data. If there is customer activity, Fridge Y will continue to ignore any reservation in the queue 327 (e.g., the management server continues to hold the reservations in the queue 327). Once there is no longer customer activity, Fridge Y may transmit an message to the management server to release reservations held in the queue 327. Accordingly, Fridge Y sequentially receives and reads (step 340) the pending reservations from the queue 327. As part of processing the reservation, Fridge Y queries inventory database 332 to determine (step 342) whether Fridge Y has sufficient inventory to fulfill the reservation. If Fridge Y does not have sufficient inventory, Fridge Y sends (step 352) a reservation failed status update to the management server. On the other hand, if Fridge Y does have sufficient inventory, Fridge Y adds the reservation to a reservation database 334 (such as the reservation database 234 of FIG. 2). Fridge Y then sends a notification to the management server indicating that Fridge Y has sufficient inventory to process the reservation a transmits a unique identifier pickup code to the customer electronic device 105 of FIG. 1. This process may repeat for each reservation in the queue 327.

Upon receiving the notification that Fridge Y is able fulfill the reservation, the management server attempts to process (step 346) payment using the payment token included in the reservation request at step 333. At step 348, the management server determines whether the payment token was successfully processed. If the payment token was successfully processed, the management server sets (step 350) a status flag indicate the success. The management server may also transmit a notification of the failure to Fridge Y to indicate that Fridge Y should remove the reservation from the reservation database 334. On the other hand, if the payment token was not successfully processed, the management server sets (step 352) the status flag to indicate the failure. At step 354, the management server updates the reservation database to indicate the determined reservation status.

The management server then transmits (step 356) a notification to the customer electronic device indicative of the reservation status. In some embodiments, the notification is a push message formatted in compliance with an application programming interface (API) of the reservation application executing on the customer electronic device. In other embodiments, the notification is a text message. If the reservation was successful, the notification includes an indication of the purchase code. In some embodiments, the purchase code is included as text displayed on the screen of the customer electronic device. Additionally or alternatively, the purchase code may be embedded in a barcode or QR code and/or stored in local memory for transfer via a near field communication (NFC) or other short range transmitter.

Turning now to the flow chart 360 illustrated in FIG. 4, at some point after the completion of the process 300, a user 307 of the customer electronic device interacts with Fridge Y. As part of the interaction, the vending machine 315 receives an indication that the user 307 has reserved an item and presents an interface enabling the user 307 to input (step 362) the purchase code. The interface may include a text box for reception of a string, a camera interface configured to read a barcode or QR code displayed on the screen of the customer electronic device, or enable a NFC or other short range receiver to detect the transmission of a file indicating the purchase code.

In response, Fridge Y utilizes the purchase code to query the reservation database 334. More particularly, Fridge Y determines (step 368) whether the received purchase code matches a purchase code associated with a reservation stored at the reservation database 334. If the purchase code matches a purchase code of a stored reservation, Fridge Y issues (step 366) commands that cause Fridge Y to vend any items included in the matching reservation record. On the other hand, if the received purchase code does not match a purchase code of a reservation stored in the reservation database 334, Fridge Y may present (step 368) an indication the purchase code is either invalid or expired. To this end, the reservation may include an indication of a time at which the reservation expires. If Fridge Y detects the reservation expiration without receiving the corresponding purchase code, Fridge Y may modify the record of the reservation at the reservation database 334 to indicate that the purchase code is expired.

Figure 5:
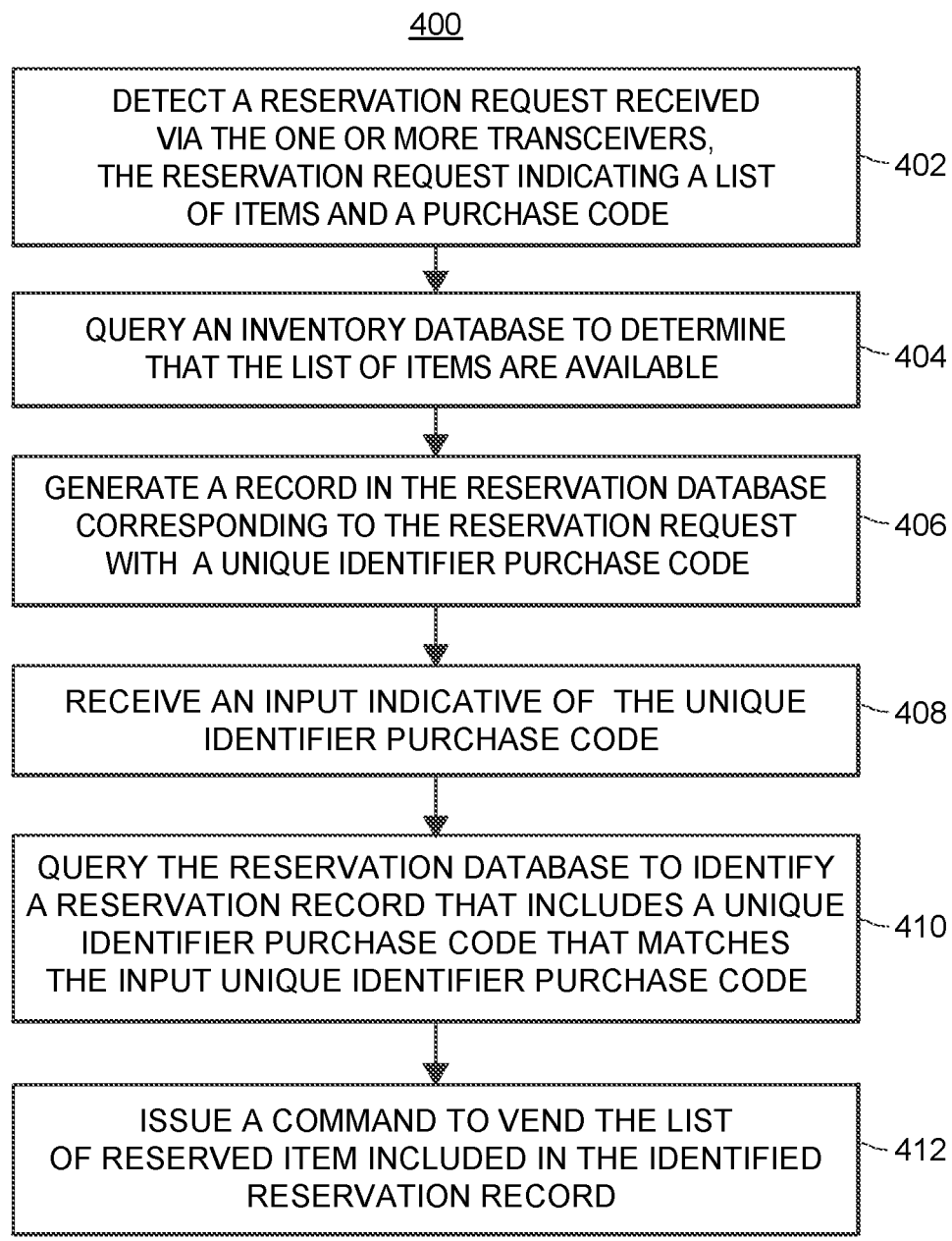
FIG. 5 is a flow diagram of an example method for a reserve and pay process implemented at the vending machine of FIG. 1, 2, 3, or 4.

FIG. 5 illustrates an example method 400 for implementing the reserve and pay functionality described herein. The method 400 is implemented by a vending machine, such as the vending machines 115 and 215 of FIGS. 1 and 2, respectively or Fridge Y of FIG. 3.

The method 400 may begin when the vending machine detects a reservation request received via one or more transceivers (block 402). The reservation request indicates a list of items and a purchase code. In order to prevent a race condition between local and remote users of the vending machine, some embodiments include detecting the presence of a customer at the vending machine. Responsive to detecting the presence of the customer at the vending machine, the vending machine may prevent the detection of the reservation request, such as by disabling the one or more transceivers. Similarly, the vending machine may detect when the customer is no longer present at the vending machine. Responsive to detecting that the customer is no longer present, the vending machine may then enable the ability of the vending machine to detect the reservation request, such as by enabling the one or more transceivers.

At block 404, the vending machine queries an inventory database (such as the inventory databases 232 and 332 of FIGS. 2 and 3, respectively) to determine that the list of items are available. At block 406, the vending machine generates a record in a reservation database (such as the reservation databases 234 and 334 of FIGS. 2 and 3, respectively) with a unique identifier purchase code.

At block 408, the vending machine receives an input indicative of the unique identifier purchase code. The input unique identifier purchase code may be received via a display unit, a camera, and/or a transceiver. At block 410, the vending machine queries the reservation database to identify a reservation record that includes a unique identifier purchase code that matches the input unique identifier purchase code. At block 412, the vending machine issues a command to vend the list of reserved items included in the identified reservation record.

Automatic Unloading

Figure 6:
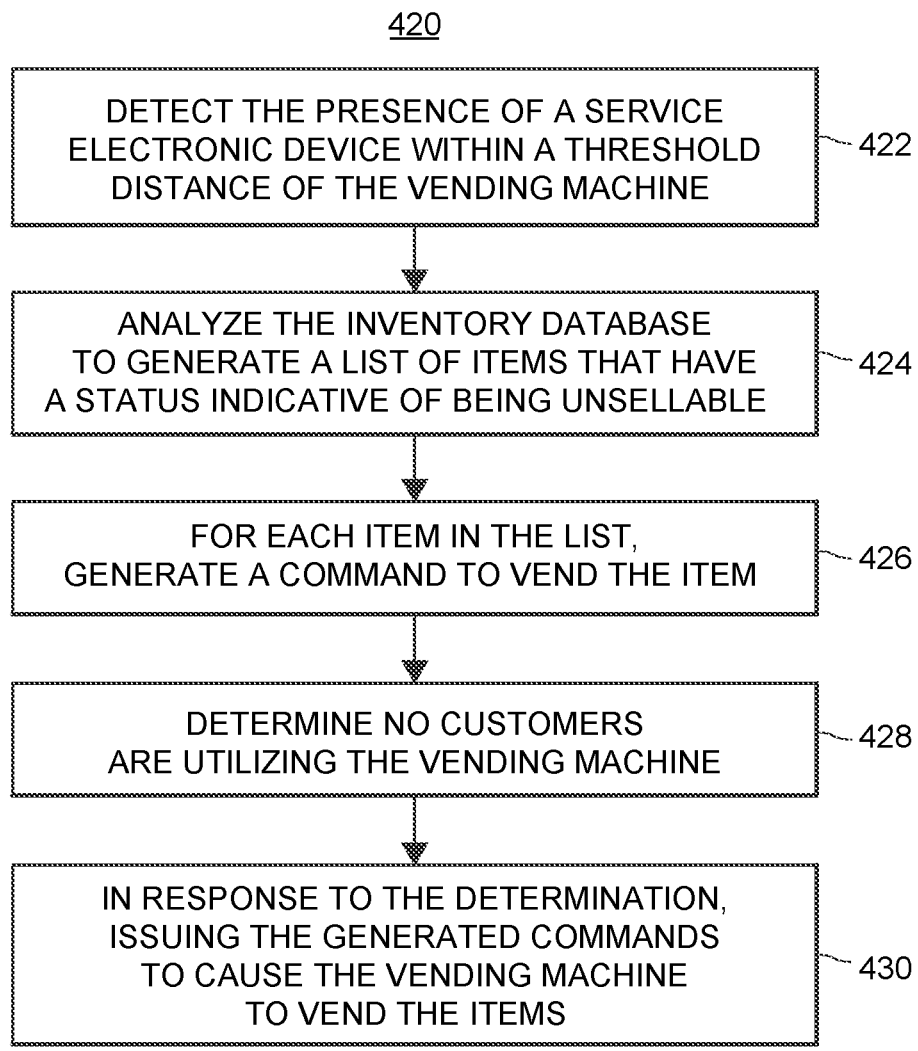
FIG. 6 is a flow diagram of an example method for an automatic unloading process implemented at the vending machine of FIG. 1, 2, 3, or 4.

FIG. 6 illustrates an example method 420 for implementing the automatic unloading functionality described herein. The method 420 is implemented by a vending machine, such as the vending machines 115 and 215 of FIGS. 1 and 2, respectively or Fridge Y of FIG. 3.

The method 420 begins when the vending machine detects the presence of a service electronic device (such as the service electronic device 110 of FIG. 1) within a threshold distance of the vending machine. In some embodiments, the threshold distance is defined by a geofence surrounding the vending machine. In these embodiments, a management server, such as the management server 125 of FIG. 1 may maintain the geofence. That is, the service electronic device may transmit location as determined by a positioning system (e.g., GPS) to the management server, which determines whether the received location is within the geofenced region. It should be appreciated that while some geofences may be circular, the geofenced region may take any shape. When the received location is within the geofenced region, the management server transmits an indication to the vending machine that the service electronic device is within the threshold distance.

In other embodiments, the vending machine determines whether the service electronic device is within the threshold distance by determining that the service electronic device is within a broadcast range of a particular transceiver of the vending machine. For example, one of the transceivers may be a Bluetooth transceiver that scans for devices broadcasting a Bluetooth identity. An application executing on the service electronic device may configure the service electronic device to be discoverable by Bluetooth devices. Further, the application may configure the identity associated with the service electronic device such that the vending machine is able to analyze the identity to determine that the identity corresponds to a service electronic device. In this example, when the Bluetooth transceiver of the vending machine detects a Bluetooth device that has an identity indicative of the service electronic device, the vending machine may determine that the service electronic device is within the threshold distance. In some implementations, to prevent other devices spoofing a service electronic device, a PIN or other code is exchanged to ensure that the identity actually corresponds to a service electronic device.

At block 424, the vending machine analyzes an inventory database (such as the inventory databases 232 and 332 of FIGS. 2 and 3, respectively) to generate a list of items having a status indicative of being unsellable. For example, the status may indicate that the item is expired, recalled, been exposed to a temperature outside of a suitable range for too long, etc. At block 426, the vending machine generates a command to vend each item in the list of unsellable items. As described with respect to FIG. 2, the command may be formatted to instruct one or more vending actuators to dispense the item stored at a particular slot that corresponds to the item within the list of unsellable items.

To prevent the automatic unloading of products from impacting the customer experience, at block 428 the vending machine determines that no customers are utilizing the vending machine. In some embodiments, the vending machine detects the expiration of a timer (e.g., thirty seconds, one minute, two minutes, five minutes, etc.) that begins when a customer activity session expires. According to aspects, the customer activity session expires when a customer completes a purchase or if a session timeout occurs. Additionally or alternatively, the vending machine may detect the presence of a customer using a camera. Accordingly, the vending machine may analyze image data generated by the camera to determine that no customers are standing in front of the vending machine. In response to determining that no customers are utilizing the vending machine, at block 430 the vending machine issues the commands generated at block 426. As a result, the vending machine automatically begins vending the unsellable items to reduce vending machine downtime.

Item Lockout

Figure 7:
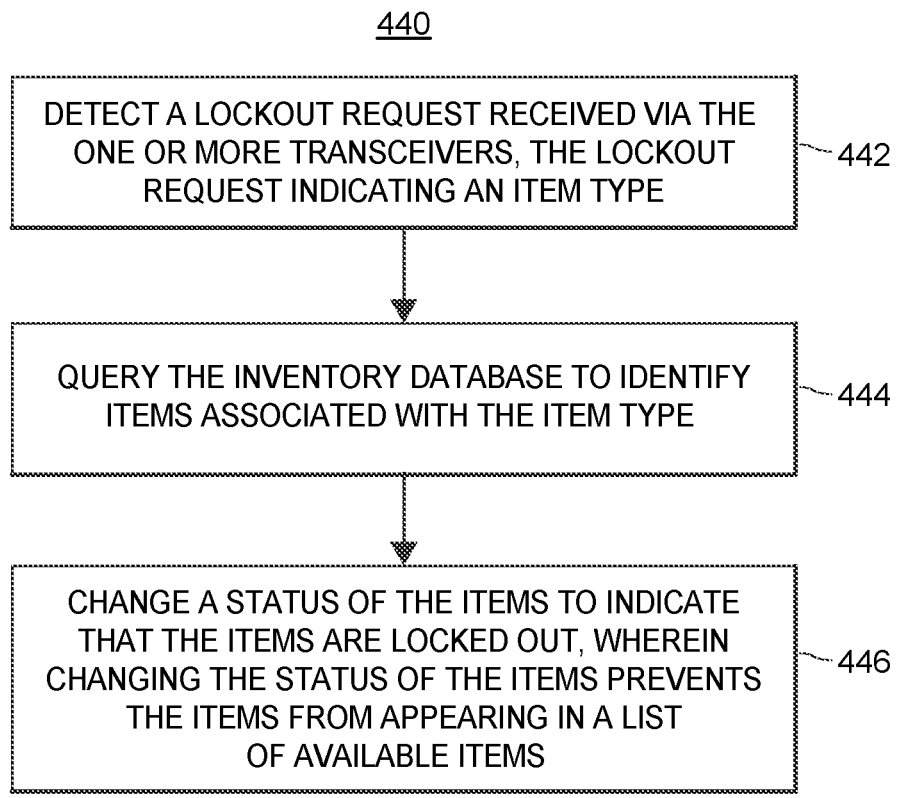
FIG. 7 is a flow diagram of an example method for an item lockout process implemented at the vending machine of FIG. 1, 2, 3, or 4.

FIG. 7 illustrates an example method 440 for implementing the remote item lockout functionality described herein. The method 440 is implemented by a vending machine, such as the vending machines 115 and 215 of FIGS. 1 and 2, respectively or Fridge Y of FIG. 3.

The method 440 begins when the vending machine detects a lockout request received via the one or more transceivers, the lockout request indicating an item type. The item type may be a SKU or an item category (e.g. salad). In one scenario, the lockout request is an indication that the item type has been recalled. For example, a management server (such as the management server 125 of FIG. 1) may receive an indication from a supplier or government agency that the item type has been recalled. Accordingly, the management server may transmit the lockout request to prevent the vending machine from distributing recalled items.

In another scenario, the lockout request is indicative of the item type being exposed to temperatures outside of a suitable range of temperatures for more than a threshold duration. As described above, each item or item type may correspond to a suitable range of temperatures. Accordingly, database records associated with the item or item type may include an indication of the suitable range of temperatures. In this scenario, the vending machine includes a temperature sensor that monitors the temperature within the vending machine. The vending machine may then periodically report the temperature to the management server. The management server may then compare the reported temperature from the vending machine to the suitable range in the item type records. If the management system determines that the temperature of the vending machine has been outside of a suitable range of temperatures for a threshold duration, the management server may generate a lockout request for those item types.

At block 444, the vending machine queries an inventory database (such as the inventory databases 232 and 332 of FIGS. 2 and 3, respectively) to identify items associated with the item type. At block 446, the vending machine changes the status of the items to indicate that the items are locked out. In some embodiments, the vending machine changes the record for each individual item. In other embodiments, the item status is maintained as parameter associated with the item type. In these embodiments, changing the status of the item type record propagates the change to each item. In any event, changing the status of the item prevents the item from appearing in a list of available items. For example, the management server may periodically request a list of available items to facilitate the above-described reserve and pay functionality. As another example, when a customer interacts with a display unit of the vending machine, the locked out items do not appear in a user interface indicating available items. Accordingly, customers are unable to purchase locked out items.

ADDITIONAL CONSIDERATION

As mentioned above, aspects of the systems and methods described herein are controlled by one or more controllers. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, cloud computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

What is claimed is:

1. A vending machine comprising:
   one or more processors;
   one or more transceivers adapted to communicate with a management server over a one or more communication networks;
   an inventory database configured to store item records of items offered by the vending machine;
   a reservation database configured to store reservation records of a reservation for items corresponding to records stored in the inventory database, wherein each reservation record includes a purchase code and a list of reserved items; and
   one or more non-transitory memories coupled to the one or more processors, the reservation database, the inventory database, and the one or more transceivers, the one or more non-transitory memories storing a set of computer executable instructions that, when executed by the one or more processors, cause the vending machine to:
      detect a reservation request received via the one or more transceivers, the reservation request indicating a list of items and a purchase code;
      query the inventory database to determine that the list of items are available;
      generate a record in the reservation database corresponding to the reservation request, the record indicating a unique identifier purchase code;
      receive an input indicative of the unique identifier purchase code;
      query the reservation database to identify a reservation record that includes a unique identifier purchase code that matches the input unique identifier purchase code; and
   issue a command to vend the list of reserved items included in the identified reservation record, wherein the instructions, when executed by the one or more processors, further cause the vending machine to:
      detect a presence of a customer at the vending machine; and
      while the presence of the customer is detected, prevent the detection of the reservation request.

2. The system of claim 1, wherein to prevent the detection of the reservation request, the instructions, when executed by the one or more processors, cause the vending machine to:
   disable the one or more transceivers or route the request to a queue.

3. The system of claim 1, wherein the instructions, when executed by the one or more processors, cause the vending machine to:
   detect that the customer is no longer present at the vending machine.

4. The system of claim 3, wherein the instructions, when executed by the one or more processors, cause the vending machine to:
   responsive to detecting that the customer is no longer present, enable the detection of the reservation request.

5. The system of claim 4, wherein to enable the detection of the reservation request, the instructions, when executed by the one or more processors, cause the vending machine to:
   enable the one or more transceivers or access requests stored in a queue.

6. The system of claim 1, wherein the list of items is obtained by a customer electronic device via a voice interface.

7. The system of claim 1, wherein the record in the reservation database includes a reservation expiration indicator.

8. The system of claim 7, wherein the instructions, when executed by the one or more processors, cause the vending machine to:
   detect the expiration of a reservation stored in the reservation database; and
   modify the record of the expired reservation in the reservation database to indicate an expired status.

9. A computer-implemented method executed by one or more processors of a vending machine, the method comprising:
   detecting, by the one or more processors, a reservation request indicating a list of items and a purchase code;
   querying, by the one or more processors, an inventory database to determine that the list of items are available;
   generating, by the one or more processors, a record in a reservation database corresponding to the reservation request, the record indicating a unique identifier purchase code;
   receiving an input indicative of the unique identifier purchase code;

querying, by the one or more processors, the reservation database to identify a reservation record that includes a unique identifier purchase code that matches the input unique identifier purchase code; and issuing, by the one or more processors, a command to vend the list of reserved items included in the identified reservation record;

wherein the method further comprises:
- detecting, by the one or more processors, a presence of a customer at the vending machine; and
- while presence of the customer is detected, preventing, by the one or more processors, the detection of the reservation request.

10. The method of claim 9, wherein preventing the detection of the reservation request comprises:
disabling, by the one or more processors, one or more transceivers associated with the vending machine or routing, by the one or more processors, the request to a queue.

11. The method of claim 9, further comprising:
detecting, by the one or more processors, that the customer is no longer present at the vending machine.

12. The method of claim 11, further comprising:
responsive to detecting that the customer is no longer present, enabling, by the one or more processors, the detection of the reservation request.

13. The system of claim 12, wherein enabling the detection of the reservation request comprises:
enabling, by the one or more processors, one or more transceivers of the vending machine or accessing, by the one or more processors, requests stored in a queue.

14. The method of claim 1, wherein the list of items is obtained by a customer electronic device via a voice interface.

15. The method of claim 9, wherein the instructions, when executed by the one or more processors, cause the vending machine to:
- detecting, by one or more processors, an expiration of a reservation stored in the reservation database; and
- modifying, by the one or more processors, the record of the expired reservation in the reservation database to indicate an expired status.

16. A non-transitory computer-readable storage medium storing processor-executable instructions that, when executed by one or more processors, cause the one or more processors to:
- detect a reservation request indicating a list of items and a purchase code;
- query an inventory database to determine that the list of items are available;
- generate a record in a reservation database corresponding to the reservation request, the record indicating a unique identifier purchase code;
- receive an input indicative of the unique identifier purchase code;
- query the reservation database to identify a reservation record that includes a unique identifier purchase code that matches the input unique identifier purchase code; and
- issue a command to vend the list of reserved items included in the identified reservation record, wherein the instructions, when executed by the one or more processors, further cause the one or more processors to:
  - detect a presence of a customer at the vending machine; and
  - while the presence of the customer is detected, prevent the detection of the reservation request.

* * * * *